(12) United States Patent
Cresens et al.

(10) Patent No.: US 7,538,317 B2
(45) Date of Patent: May 26, 2009

(54) METHOD OF DETERMINING NON-UNIFORMITY OF DETECTOR INVENTORY

(75) Inventors: Marc Cresens, Diest (BE); Walter Exelmans, Merksem (BE)

(73) Assignee: Agfa HealthCare NV, Mortsel (BE)

( * ) Notice: Subject to any disclaimer, the term of this patent is extended or adjusted under 35 U.S.C. 154(b) by 0 days.

(21) Appl. No.: 11/764,518

(22) Filed: Jun. 18, 2007

(65) Prior Publication Data
US 2008/0001076 A1    Jan. 3, 2008

Related U.S. Application Data

(60) Provisional application No. 60/805,893, filed on Jun. 27, 2006.

(30) Foreign Application Priority Data

Jun. 19, 2006    (EP) .................... 06115648

(51) Int. Cl.
*G01D 18/00*    (2006.01)
(52) U.S. Cl. .................... 250/252.1
(58) Field of Classification Search .............. 250/252.1, 250/370.01–370.15; 378/98.8
See application file for complete search history.

(56) References Cited

U.S. PATENT DOCUMENTS 6,118,846 A * 9/2000 Liu ................ 378/62
6,350,985 B1 * 2/2002 Rodricks et al. ......... 250/252.1
2004/0257355 A1 * 12/2004 Naugler .................. 345/204

FOREIGN PATENT DOCUMENTS

DE    103 27 036 A1    9/2004

OTHER PUBLICATIONS

Fedina, S.A., et al., "Investigation of the Relative Sensitivity of Thermoluminescent Detectors in Standard Cassettes," Soviet Atomic Energy, Consultants Bureau, New York, US, vol. 64, No. 1, Jan. 1988, pp. 83-84.
Floyd, Carey E. Jr., et al., "Quantitative Radiographic Imaging Using a Photostimulable Phosphor System," Medical Physics, vol. 17, No. 3, May/Jun. 1990, pp. 454-459.
Floyd, Carey E. Jr., et al., "Imaging Characteristics of an Amorphous Silicon Flat-Panel Detector for Digital Chest Radiography," Radiology, vol. 218, No. 3, Mar. 2001, pp. 683-688.
Samei, Ehsan, et al., "Performance Evaluation of Computed Radiography Systems," Medical Physics, vol. 28, No. 3, Mar. 2001, pp. 361-371.
Tucker, Jonathan E., at al., "Photostimulable Storage Phosphor Image Acquisition: Evaluation of Three Commercially Available Sate-of-the-Art Systems" Journal of Digital Imaging, vol. 12, No. 2, May 1999, pp. 54-58.
Wang, Xiaohui, et al., "Comprehensive and Automated Image Quality Performance Measurement of Computed Radiography Systems," Proceedings of SPIE, vol. 4320, Feb. 18, 2001, pp. 308-315.
European Search Report from European Application No. EP 06115648, filed on Jun. 19, 2006.

* cited by examiner

*Primary Examiner*—David P Porta
*Assistant Examiner*—Kiho Kim
(74) *Attorney, Agent, or Firm*—Houston Eliseeva LLP (57) ABSTRACT

Each of the detectors of the inventory are subjected to an identical flat field exposure to generate a radiation mage in each of the detectors, from the radiation images the overall field distribution is determined and neutralized in the images, next the non-uniformity is calculated.

12 Claims, 11 Drawing Sheets

| | ROI SIGNALS GENERATOR ( simulates consequtive output from single-image analysis ) | | | | | | | | | | | | | simulated image-analysis [ % FS lin ] | | | | | check |
|---|---|---|---|---|---|---|---|---|---|---|---|---|---|---|---|---|---|---|---|
| | exagerated shot-to-shot instability | local sensitivity variation peak-to-peak gain | | | | 2D exposure field (heel,distance,angle through filter) shading shading shading shading shading | | | | | | | | output | output | output | output | output | plate average ( equals input ) |
| | | | 5 | | | 0,96 | 1,04 | 1,02 | 0,94 | 1 | | | | | | | | | |
| | input | random | random | random | random | random | | | | | | avg | correction | Q1 | Q2 | Q3 | Q4 | CENTER | PLATE_avg |
| A | 70,86 | 0,36 | 0,41 | 0,44 | 0,33 | 0,84 | 69,76 | 75,83 | 74,50 | 68,18 | 75,08 | 72,67 | 0,975 | 68,02 | 73,94 | 72,64 | 66,48 | 73,21 | 70,86 |
| B | 72,25 | 0,97 | 0,88 | 0,70 | 0,46 | 0,79 | 74,02 | 79,74 | 77,27 | 70,10 | 76,18 | 75,46 | 0,957 | 70,87 | 76,35 | 73,98 | 67,11 | 72,94 | 72,25 |
| C | 71,65 | 0,52 | 0,02 | 0,57 | 0,51 | 0,38 | 71,28 | 74,60 | 75,98 | 69,75 | 73,56 | 73,03 | 0,981 | 69,93 | 73,19 | 74,54 | 68,43 | 72,16 | 71,65 |
| D | 74,92 | 0,41 | 0,55 | 0,01 | 0,43 | 0,17 | 73,88 | 80,76 | 76,45 | 72,47 | 75,78 | 75,87 | 0,988 | 72,96 | 79,75 | 75,49 | 71,56 | 74,83 | 74,92 |
| E | 75,15 | 0,62 | 0,69 | 0,84 | 0,57 | 0,19 | 75,11 | 81,73 | 80,92 | 73,34 | 76,11 | 77,44 | 0,970 | 72,89 | 79,31 | 78,52 | 71,17 | 73,86 | 75,15 |
| F | 76,24 | 0,91 | 0,96 | 0,40 | 0,84 | 0,49 | 77,57 | 84,30 | 79,80 | 75,62 | 78,68 | 79,20 | 0,963 | 74,68 | 81,15 | 76,82 | 72,79 | 75,75 | 76,24 |
| G | 74,38 | 0,30 | 0,90 | 0,61 | 0,48 | 0,47 | 72,83 | 82,05 | 78,98 | 72,20 | 76,72 | 76,55 | 0,972 | 70,76 | 79,72 | 76,73 | 70,14 | 74,54 | 74,38 |
| H | 77,90 | 0,09 | 0,36 | 0,99 | 0,05 | 0,38 | 75,22 | 82,87 | 84,49 | 73,45 | 79,82 | 79,17 | 0,984 | 74,01 | 81,54 | 83,13 | 72,27 | 78,54 | 77,90 |
| I | 77,11 | 0,78 | 0,79 | 0,40 | 0,63 | 0,41 | 77,79 | 84,31 | 80,87 | 75,44 | 79,17 | 79,48 | 0,970 | 75,47 | 81,80 | 78,27 | 73,19 | 76,81 | 77,11 |
| J | 72,61 | 0,12 | 0,84 | 0,27 | 0,27 | 0,32 | 70,28 | 79,90 | 75,43 | 69,53 | 74,19 | 73,86 | 0,983 | 69,09 | 78,54 | 74,15 | 68,35 | 72,93 | 72,61 |
| K | 75,51 | 0,10 | 0,86 | 0,22 | 0,49 | 0,25 | 72,99 | 82,99 | 78,13 | 73,26 | 76,75 | 76,83 | 0,983 | 71,74 | 81,57 | 76,79 | 72,03 | 75,43 | 75,51 |
| L | 74,29 | 0,03 | 0,47 | 0,11 | 0,53 | 0,65 | 71,47 | 79,71 | 76,33 | 72,30 | 77,52 | 75,47 | 0,984 | 70,35 | 78,47 | 75,14 | 71,17 | 76,31 | 74,29 |
| M | 69,55 | 0,27 | 0,92 | 0,06 | 0,37 | 0,52 | 68,06 | 77,11 | 71,27 | 67,10 | 72,14 | 71,14 | 0,978 | 66,54 | 75,39 | 69,68 | 65,61 | 70,53 | 69,55 |
| N | 71,15 | 0,56 | 0,81 | 0,41 | 0,95 | 0,66 | 71,00 | 78,22 | 74,65 | 71,33 | 74,45 | 73,93 | 0,962 | 68,33 | 75,27 | 71,84 | 68,65 | 71,65 | 71,15 |
| O | 79,90 | 0,73 | 0,51 | 0,74 | 0,79 | 0,54 | 80,22 | 85,77 | 85,25 | 78,81 | 82,61 | 82,53 | 0,968 | 77,66 | 83,03 | 82,53 | 76,30 | 79,97 | 79,90 |
| P | 76,48 | 0,72 | 0,37 | 0,55 | 0,77 | 0,50 | 76,86 | 81,45 | 80,83 | 75,51 | 78,98 | 78,72 | 0,971 | 74,67 | 79,12 | 78,52 | 73,35 | 76,73 | 76,48 |
| Q | 71,01 | 0,16 | 0,56 | 0,62 | 0,28 | 0,60 | 68,95 | 76,75 | 75,59 | 68,06 | 74,02 | 72,68 | 0,977 | 67,37 | 74,99 | 73,86 | 66,50 | 72,33 | 71,01 |
| R | 74,43 | 0,39 | 0,26 | 0,39 | 0,74 | 0,73 | 73,35 | 78,77 | 77,90 | 73,44 | 78,10 | 76,31 | 0,975 | 71,54 | 76,83 | 75,98 | 71,63 | 76,18 | 74,43 |
| S | 74,33 | 0,24 | 0,53 | 0,88 | 0,11 | 0,86 | 72,50 | 80,04 | 80,32 | 70,40 | 78,64 | 76,38 | 0,973 | 70,55 | 77,89 | 78,16 | 68,51 | 76,53 | 74,33 |
| T | 72,98 | 0,64 | 0,24 | 0,09 | 0,47 | 0,24 | 73,15 | 77,15 | 74,88 | 70,82 | 74,18 | 74,04 | 0,986 | 72,11 | 76,05 | 73,81 | 69,81 | 73,12 | 72,98 |
| U | 72,34 | 0,01 | 0,95 | 0,71 | 0,35 | 0,67 | 69,48 | 80,19 | 77,41 | 69,63 | 76,69 | 74,68 | 0,969 | 67,30 | 77,68 | 74,98 | 67,45 | 74,29 | 72,34 |
| V | 69,08 | 0,69 | 0,45 | 0,70 | 0,05 | 0,54 | 69,65 | 74,20 | 74,01 | 65,17 | 71,80 | 70,97 | 0,973 | 67,80 | 72,23 | 72,05 | 63,44 | 69,89 | 69,08 |
| W | 71,86 | 0,13 | 0,94 | 0,21 | 0,54 | 0,75 | 69,63 | 79,60 | 74,39 | 70,09 | 75,59 | 73,86 | 0,973 | 67,75 | 77,44 | 72,38 | 68,19 | 73,55 | 71,86 |
| X | 71,90 | 0,29 | 0,14 | 0,87 | 0,43 | 0,78 | 70,40 | 75,53 | 77,80 | 69,80 | 75,82 | 73,83 | 0,974 | 68,56 | 73,56 | 75,76 | 67,78 | 73,84 | 71,90 |
| Y | 73,60 | 0,61 | 0,70 | 0,89 | 0,90 | 0,13 | 73,61 | 80,17 | 79,63 | 73,39 | 74,23 | 76,21 | 0,966 | 71,09 | 77,43 | 76,91 | 70,86 | 71,69 | 73,60 |
| Z | 71,50 | 0,93 | 0,83 | 0,35 | 0,05 | 0,00 | 73,12 | 78,70 | 77,70 | 67,46 | 71,52 | 73,10 | 0,978 | 71,52 | 76,98 | 73,06 | 65,98 | 69,96 | 71,50 |
| AA | 75,34 | 0,34 | 0,93 | 0,60 | 0,27 | 0,39 | 73,95 | 83,19 | 79,90 | 72,08 | 77,31 | 77,28 | 0,975 | 72,09 | 81,10 | 77,89 | 70,26 | 75,36 | 75,34 |
| AB | 74,29 | 0,53 | 0,05 | 0,86 | 0,40 | 0,94 | 73,88 | 77,53 | 80,15 | 71,71 | 78,99 | 76,45 | 0,972 | 71,79 | 75,33 | 77,88 | 69,68 | 76,76 | 74,29 |
| AC | 72,46 | 0,16 | 0,93 | 0,39 | 0,12 | 0,18 | 70,34 | 80,19 | 75,90 | 68,67 | 73,38 | 73,70 | 0,983 | 69,16 | 78,85 | 74,62 | 67,52 | 72,15 | 72,46 |
| | | | | | | | | | | | | | avg | 70,92 | 77,74 | 75,73 | 69,53 | 74,20 | |
| | | | | | | | | | | | | | median | 70,87 | 77,68 | 75,49 | 69,68 | 73,86 | |

| inventory median&average | | local signal ratios relative to center ROI | | | reference |
|---|---|---|---|---|---|
| (statistically estimated 2D exposure field signature) | avg | 0,947 | | 1,068 | 1,044 | 0,978 |
| | | 0,993 | 1,038 | 1,034 | 0,965 | 1 |
| | | 0,920 | 0,964 | 1,003 | 0,940 | 1 |
| | | 0,520 | 1,026 | 0,978 | 0,927 | 1 |
| | | 0,919 | 0,996 | 1,011 | 0,906 | 1 |
| | | 0,997 | 1,037 | 1,006 | 0,929 | 1 |
| | | 0,980 | 1,043 | 1,037 | 0,909 | 1 |
| | | 1,001 | 1,094 | 1,077 | 0,977 | 1 |
| | | 0,956 | 1,021 | 0,997 | 0,935 | 1 |
| | | 0,909 | 1,013 | 0,996 | 0,945 | 1 |
| | | 0,962 | 1,031 | 1,054 | 0,966 | 1 |
| | | 0,934 | 1,015 | 0,996 | 0,908 | 1 |
| | | 0,954 | 1,062 | 1,061 | 0,973 | 1 |
| | | 0,918 | 1,043 | 0,965 | 0,930 | 1 |
| | | 0,948 | 0,997 | 0,999 | 0,940 | 1 |
| | | 0,946 | 1,010 | 1,018 | 0,968 | 1 |
| | | 0,963 | 1,061 | 1,029 | 0,948 | 1 |
| | | 0,940 | 1,002 | 0,984 | 0,913 | 1 |
| | | 0,959 | 1,074 | 1,052 | 0,954 | 1 |
| | | 0,997 | 1,036 | 1,050 | 0,978 | 1 |
| | | 0,966 | 1,061 | 1,001 | 0,957 | 1 |
| | | 0,954 | 0,994 | 1,004 | 0,920 | 1 |
| | | 0,946 | 0,988 | 0,998 | 0,933 | 1 |
| | | 0,970 | 1,032 | 1,018 | 0,938 | 1 |
| | | 0,944 | 1,079 | 1,000 | 0,930 | 1 |
| | | 0,930 | 1,049 | 1,014 | 0,921 | 1 |
| | | 0,948 | 1,013 | 0,988 | 0,948 | 1 |
| | | 0,986 | 1,054 | 1,050 | 0,988 | 1 |
| | | 0,962 | 1,071 | 1,015 | 0,925 | 1 |
| | median | 0,954 | 1,034 | 1,017 | 0,943 | |
| | statistical estimation error | relative signal-ratios for the 4 excentric AAPM-ROIs | | | | 1 |
| | | % deviation from the inventory median per ROI | | | | |
| | | -0,8 | 3,1 | 3,3 | 4,1 | 0 |
| | | 4,1 | 0,1 | 2,3 | 2,8 | 0 |
| | | -3,6 | -5,1 | -0,8 | 0,0 | 0 |
| | | -3,6 | -1,0 | -3,3 | -1,4 | 0 |
| | | -3,7 | -3,9 | 0,0 | -3,6 | 0 |
| | | 4,5 | 0,0 | -0,5 | -1,1 | 0 |
| | | 2,7 | 0,7 | 2,5 | -3,3 | 0 |
| | | 4,9 | 5,6 | 6,5 | 4,0 | 0 |
| | | 0,2 | -1,5 | -1,4 | -0,5 | 0 |
| | | -4,8 | -2,3 | -1,5 | 0,6 | 0 |
| | | 0,9 | -0,5 | 4,2 | 2,8 | 0 |
| | | -2,1 | -2,0 | -1,5 | -3,6 | 0 |
| | | 0,0 | 2,5 | 4,9 | 3,5 | 0 |
| | | -3,8 | 0,7 | -4,6 | -1,0 | 0 |
| | | -0,7 | -3,8 | -1,3 | 0,0 | 0 |
| | | -0,9 | -2,5 | 0,7 | 3,1 | 0 |
| | | 1,0 | 2,4 | 1,8 | 0,9 | 0 |
| | | -1,5 | -3,3 | -2,7 | -2,8 | 0 |
| | | 0,5 | 3,6 | 4,0 | 1,5 | 0 |
| | | 4,5 | 0,0 | 3,9 | 4,1 | 0 |
| | | 1,3 | 2,4 | -1,0 | 1,9 | 0 |
| | | 0,0 | -4,1 | -0,7 | -2,1 | 0 |
| | | -0,8 | -4,7 | -1,3 | -0,7 | 0 |
| | | 1,6 | -0,4 | 0,7 | -0,1 | 0 |
| | | -1,0 | 4,1 | -1,1 | -1,0 | 0 |
| | | -2,5 | 1,3 | 0,3 | -2,0 | 0 |
| | | -0,7 | -2,3 | -2,2 | 0,9 | 0 |
| | | 3,3 | 1,7 | 3,8 | 5,2 | 0 |
| | | 0,8 | 3,3 | 0,4 | -1,6 | 0 |

METHOD OF DETERMINING NON-UNIFORMITY OF DETECTOR INVENTORY

RELATED APPLICATIONS

This application claims priority to European Patent Application No. EP 06115648.5, filed on Jun. 19, 2006, and claims the benefit under 35 USC 119(e) of U.S. Provisional Application No. 60/805,893, filed on Jun. 27, 2006, both of which are incorporated herein by reference in their entirety.

FIELD OF THE INVENTION

The present invention relates to quality assurance of digital radiography systems.

More specifically the invention relates to quality assurance pertaining to a set of detectors, called a detector inventory, used in digital radiography systems.

BACKGROUND OF THE INVENTION

The radiography detectors are usually powder phosphor screens or needle image plates (needle IP), direct radiography detectors fabricated from, for example, amorphous silicon, amorphous selenium, complementary metal oxide semiconductor (CMOS), phosphor detector arranged for direct radiography, or the like.

A radiation image is recorded on such a radiography detector (also called 'plate') by exposing it to an X-ray field. The radiation image which is temporarily stored by the detector is read out in a so-called read out system (also called 'digitizer') where the exposed detector is scanned with light of an appropriate wavelength and where the image-wise modulated light emitted by the detector upon stimulation is detected and converted into a digital image signal representative of the radiation image.

A phosphor screen or needle image plate is commonly conveyed in a cassette and is not a part of the read out system. This implies that for each detector the uniformity of the detector needs to be evaluated.

One aspect of this uniformity is the sensitivity of the detector in each point of the detector surface relative to the average sensitivity. This notion is referred to as intrinsic uniformity. This is expressed as a percentage of the average signal emitted by the screen for a constant dose in each point of the detector surface.

Each detector can also be evaluated to determine whether the sensitivity is within specifications, i.e. whether for a given dose the signal that is emitted by the detector is within specifications.

The American Association of Physicists in Medicine Task Group #10 on Computed Radiography (abbreviated AAPM) discusses receptor reproducibility, density uniformity and artifact analysis. It is declared by this organization that the intrinsic and receptor to receptor uniformity are expected to be homogeneous and consistent. The group sets out a procedure for detector testing and also defines acceptance levels.

The prescribed procedure relates to exposure of all detectors part of a detector inventory whereby all detectors are centered relative to the axis of an incident x-ray beam. The detectors are uniformly irradiated over the entire plate surface. The signal read out of the detectors by a calibrated read out system is then evaluated relative to a pre-defined acceptance level.

IEC published a test procedure to evaluate inter-plate sensitivity variations. The test is to confirm that inter-plate sensitivity variations of storage phosphor system are within a specified range and meet the manufacturer's specifications, or the regulatory or contractual requirements.

The AAPM group has specified that with regard to non-uniformity a 10% peak-to-peak variation is acceptable and also for specifications of sensitivity a 10% variation is acceptable.

SUMMARY OF THE INVENTION

It is an object of the present invention to provide a method to determine the uniformity of a digital radiography detector (irrespective of the read out system and impinging exposure field distribution) and to determine whether the determined uniformity falls within acceptance margins set for a detector inventory.

In general according to one aspect, the invention features a method of detecting the non-uniformity of radiation detectors participating in a detector inventory test. The method comprises subjecting each of the detectors to a substantially identical flat field exposure to generate a radiation image in each of the detectors, generating for each of the detectors a number of ROI signals representing the radiation image at a pre-defined number of regions of interest (ROIs), generating ROI signal ratios by expressing the ROI signals relative to a reference ROI signal detected in one of the regions of interest taken as reference region of interest for each of the detectors, averaging the corresponding ROI signal ratios over the detectors participating in the inventory test to extract the non-uniform characteristics of the radiation exposure, calculating the local deviations of the ROI signal ratios expressed relative to the corresponding inventory average ROI signal ratios for the detectors participating in the detector inventory test, and calculating the absolute value of the largest of the deviations from the average ROI signal ratios for each detector.

In some embodiments, an average detector inventory non-uniformity value is calculated by averaging the absolute values. Further, an acceptance criterion for the non-uniformity is defined and wherein an evaluation is made whether the deviation meets the acceptance criterion. An additional visual inspection of a radiation image of a detector participating in the inventory test is performed and may be used to overrule the result of the evaluation. Also additional ROI signal data are generated by rotating the detectors by a predefined angle, exposing the detectors to the substantially identical flat field exposure and detecting ROI signals at the same locations of the regions of interests. Preferably, the regions of interest are located in the center of a radiation detector as well as at the center of each of the quadrants.

Further advantages and embodiments of the present invention will become apparent from the following description and drawings.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3 shows the results of a data signal generator.

DETAILED DESCRIPTION OF THE PREFERRED EMBODIMENTS

To be able to perform the method according to the present invention, it is required that the detectors part of the detector inventory (also called plate inventory) are all subjected to a known and preferably substantially uniform and substantially identical irradiation field emitted by a source of radiation such as an X-ray source for a given radiation dose level.

Figure 1:
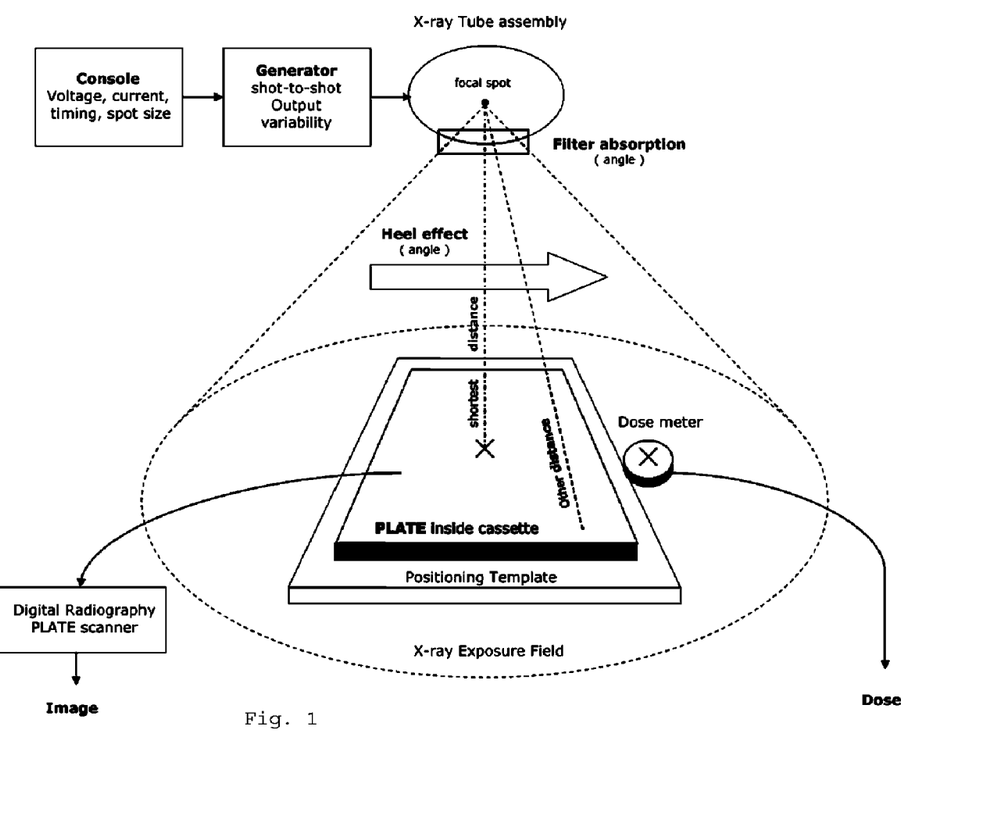
FIG. 1 is schematic drawing showing a general set up in digital radiography.

The general set up for irradiating detectors and reading the signal stored in a detector is shown in FIG. 1.

The analysis of the detectors of the detector inventory is performed on the basis of a digital image obtained by reading the signal out of the detector in a read out apparatus (also called a digitizer). In the following it is assumed that the detector is a photostimulable phosphor screen, however other types of detectors may be envisaged.

The signal detected by the digitizer originates from the irradiation level of x-rays that have impinged on the detector and from the uniformity and/or the sensitivity of the detector itself. Since these factors have a multiplicative effect, it is required that the irradiation level is equal in each location on the phosphor screen to be able to make a correct evaluation of uniformity and/or sensitivity for a set of detectors.

However, in practice variations in the irradiation field occur.

These variations originate from the fact that not every point of the detector surface is at a same distance from the source of radiation. A point on the axis of irradiation is most close to the focus of the source of radiation and will automatically receive more irradiation than a point which is situated at the border of the detector.

A second effect which causes non uniform irradiation is the so-called Heel effect, causing that the spectrum and intensity of the emitted x-rays evaluated in all directions is not uniform. This effect originates from the fact that in the anode of the x-ray source a filtering is performed by the difference in distance because the focus point is not on the surface of the anode but below the anode so that an intensity variation as well as a spectrum variation originates. Detectors in general are not only sensitive to the irradiation amount but also to the spectrum of the impinging radiation. The Heel effect thus causes non-uniformity of the irradiation of the detector surface.

A third cause of variation of the irradiation field is caused by differences of beam distance when the beam falls onto added filters thereby causing a different attenuation of beams which fall perpendicular on the filter relative to beams which pass angularly through these filters.

Due to the above-described effects the actual input irradiation field has a very complex profile. Realizing a uniform incoming radiation field for irradiation of a detector appears to be impossible.

According to one aspect of the present invention this actual irradiation field non-uniformity is first determined and then neutralized when calculating sensitivity and/or uniformity (non-uniformity) of the detector so that the ultimate result only comprises the effect of the detector itself and not of the non-uniformity of the irradiation field.

In the state of the art it has been tried to solve the above-described problem by performing two irradiations of the detector with half dose whereby the detector was positioned in a first position during the first irradiation and then rotated by 180 degrees prior to the second irradiation.

By summing up the signals read out of the detector that was subjected to two semi-dose irradiations, the effect of the non-uniform radiation field could at least partially be eliminated.

Generation of Data Regarding a Detector Inventory Test by Simulation

To obtain an adequately large number of data to perform the measurements of sensitivity and/or uniformity, a data simulation procedure as described below can be performed by a so-called region of interest (ROI) signal generator.

For a number of test detectors a signal value is generated for a number of regions of interest on the detector's surface. In the described exemplary embodiment there are five regions of interest.

The position of such zones can be chosen in correspondence with the positions defined by the above-mentioned AAPM organization.

A first zone is situated in the center of the detector on the beam axis of the irradiation field. Four more locations of regions of interest are defined within the surface area of a detector of a specific size, each of these regions of interest form the center of a quadrant on the surface area of the detector.

The average image signal in each region of interest is first generated.

In practice the data are not simulated but gathered from read out of exposed detectors. The exposure is performed with a given voltage and mAs setting of the radiation source.

However, a dose meter is also employed because practice has learned that it is not adequate to solely rely on the voltage and mAs value read from the console of the irradiation tube because shot-to-shot differences exist of the x-ray generator and the irradiation device.

The dose meter is positioned on a specified and fixed location in the irradiation field close to the detector but outside the detector area so that with this dose meter the shot-to-shot instability of the irradiation device can be determined.

By performing this measurement it will be possible to perform a correction of the signal measured in each of the five regions of interest on a detector.

In the data simulation step the shot to shot differences are simulated.

In FIG. 3, top left column, data generated by a signal generator are shown. The data are generated according to a simulation model wherein for a number of detectors a given shot-to-shot variation of the irradiation device is simulated.

The number of detectors part of this simulation example equals 27, the detectors are labeled A to Z, AA, AB and AC.

An amount of non-uniformity on each detector is also simulated in the second column. This is indicated in the column "local sensitivity variation, peak-to-peak gain". In this example the local sensitivity variation is '5', this means that it is assumed that for one image detector a variation of the peak-to-peak signal (sensitivity) of 5% can be measured.

This is used in the data generation model to generate automatically ROI signals.

The third column in FIG. 3 comprises data that relate to a simulation of the non-uniform 2D exposure field. The non-uniformity is the result of the combined effects of the Heel effect, local source to detector distances and filters used, as has been described previously. This represents a shading that is assigned to each of the ROIs (expressed relative to the center region of interest).

This is combined with the peak-to-peak gain variation for the detector.

In this way data are obtained that are suitable for image analysis in accordance with the method of the present invention. These data are given in FIG. 3, in the column with header "simulated image analysis".

This part of the table shown in FIG. 3 comprises for the center region of interest and for four more regions of interest a simulated image signal value resulting from a simulation of the above-described effects. The signal values are expressed as "percentage full scale linear values".

The digitizer renders quantized signals that have values in between zero and a maximum signal, the value of which depends on the quantization range (10 bit, 12 bit, maximum value corresponding with saturation level).

Figure 4:
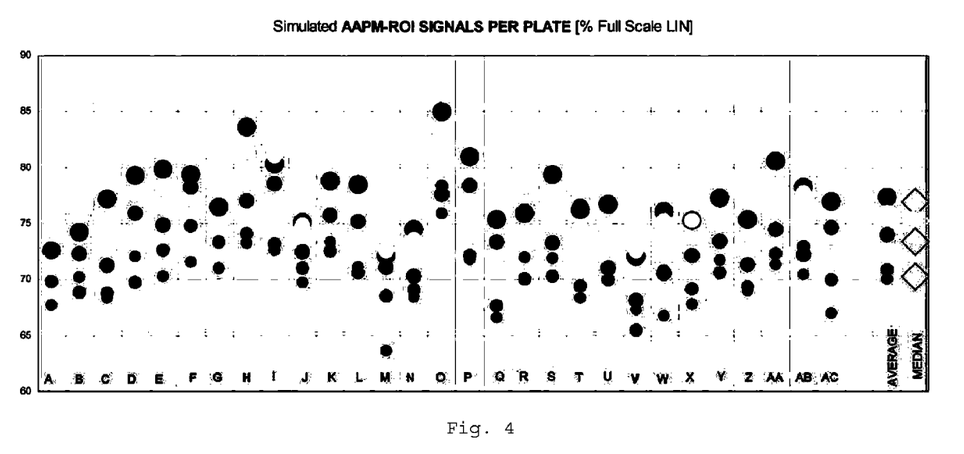
FIG. 4 illustrates graphically the simulated ROI signals per detector.

The results obtained by this simulator are displayed graphically in FIG. 4.

The abscissa of FIG. 4 shows the different detectors, indicated by the letters A to Z and AA, AB and AC.

The ordinate of this graph represents the generated signal values.

The dots represent the position of the signal value for each region of interest.

On the right side this graph shows average values.

Figure 5:
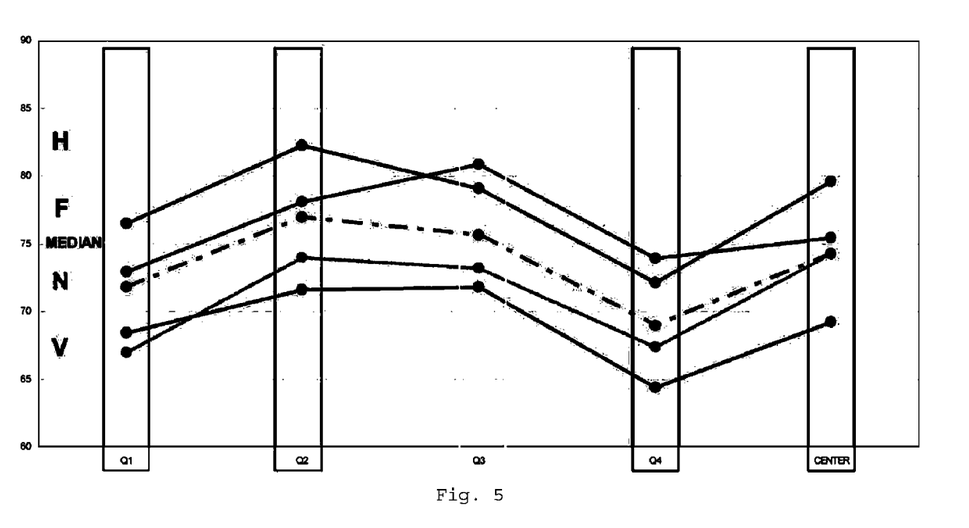
FIG. 5 shows for a number of detectors the position of the signal value for each of the regions of interest.

FIG. 5 shows for a number of detectors (H, F, N, V) the position of the signal value for each of the ROIs (Q1, Q2, Q3, Q4, center ROI) represented on the abscissa.

The average signal distribution for the four detectors is also shown (see point dotted line).

The simulation described above results in a number of data signals which can be used to illustrate and test the method of the present invention. These data serve as virtual input to the algorithm of the present invention.

It will be clear that in a real world application of the present invention signal measured on detectors part of a detector inventory are used instead of simulated data.

The real world set up is illustrated in FIG. 1.

Figure 2:
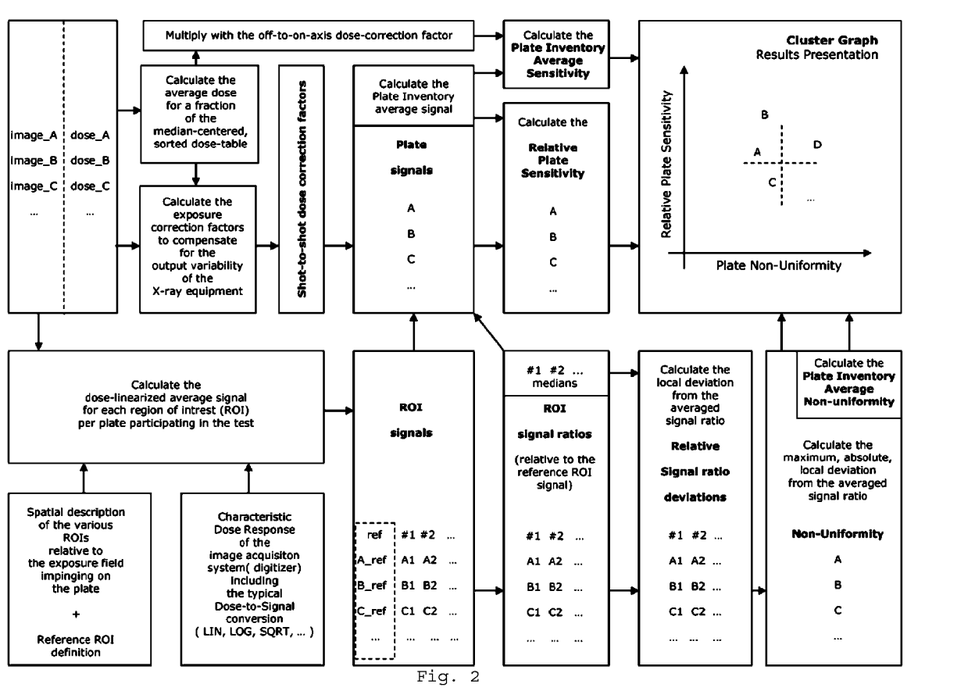
FIG. 2 is a flow diagram illustrating the successive steps of the method of the present invention.

A block scheme illustrating the successive steps of the method of the present invention is shown in FIG. 2.

Determination and Extraction of Non-Uniform Irradiation Field

The following is description of an aspect of the present invention relating to the determination of the impact of non-uniform irradiation.

Once this non-uniform irradiation has been extracted, the measured profile will be neutralized in the calculation of the non-uniformity and sensitivity of the detectors.

The test starts with a number (e.g. 20, 30 . . . ) of detectors part of a detector inventory which needs to be evaluated.

The detectors are exposed to an identical substantially uniform irradiation field.

Exposed detectors are input in a digitizing apparatus where they are scanned by means of laser light of an appropriate stimulating wavelength. Upon stimulation the detectors emit light which is detected and converted into a signal representation by means of an opto-electric transducer and converted into a digital signal representation.

The signals read out by the above-described read out apparatus (also called digitizer) on five regions of interest locations are then used for the evaluation described below. In this specific embodiment the read out signals are translated into linear signals and digitizer offset is corrected for.

For each detector the five regions of interest are defined, in these regions of interest (in a particular applications these regions of interest are circles of about 2 millimeters (mm) located in the center of the detector and in the center of each of the four quadrants) the average signal is calculated and the evaluation is continued on the basis of these five data values for each of the detectors part of the detector inventory test.

Figure 6:
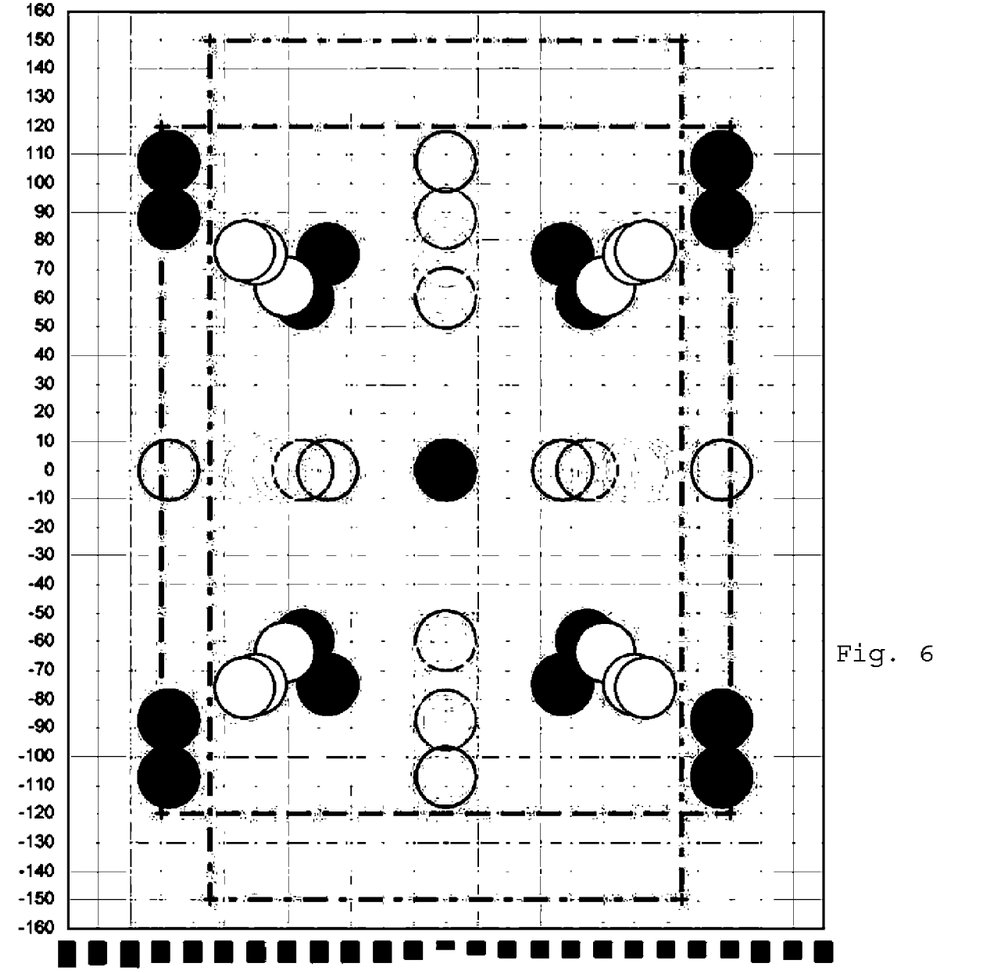
FIG. 6 shows the distribution of the locations of the different regions of interest for a number of detector sizes.

FIG. 6 shows the distribution of the locations of the different regions of interest. The dots show the position of the regions of interest for the different detector formats that are possible.

In a specific embodiment different detector formats are centered relative to the axis of irradiation.

Preferably the regions of interest are positioned so that the center of the quadrants of the largest detector format which is used in the test is located within the borders of the smallest detector format which is part of the test so that independent of the format five regions of interest can be found even in the detector of the smallest format.

It is assumed that all detectors which are part of the detector test have the same dimensions so that the regions of interest in the image are identically located.

However, this is not essential to the present invention.

It is also possible to mix plates of different dimensions in a single detector inventory test. In this case for all detectors data will be gathered about the signal value in each of the regions of interest as defined for all of these formats. So for each detector image data will be gathered for each detector format of a detector subjected to the detector inventory test (in the described embodiment 5 signal values per detector format part of the detector inventory test). The assembly of all these data contributes to the neutralization of the effect of the non-uniform irradiation field.

To be able to define and evaluate the non-uniform irradiation field the fact that each detector has an average sensitivity is taken into account.

The local sensitivity of a detector is caused by a combination of the following items: the thickness of the phosphor layer in case of a powder phosphor plate or the composition of the needle crystal layer in case of a needle image plate.

Since the signal originating from such an exposed detector for a given irradiation level is assumed to be a function of the local sensitivity of the detector and this local sensitivity has a normal distribution, we apply statistics to assume that on average, taking into account a large number of detectors, the local sensitivity of any detector is the same.

By averaging the signals for corresponding regions of interest on different detectors part of the detector inventory test (having the same location in each of the detectors) an estimation can be made of the non-uniformity of the irradiation field impinging on the detector surface.

In order not to complicate the description it was assumed that the detector inventory test only comprises detectors of the same format.

Consequentially each detector in the described embodiment has five regions of interest that are located on the same place in each of the detectors.

This means that when neutralizing the irradiation field non-uniformity only the information originating from these regions of interest is evened out.

In reality not every hospital has enough detectors of the same format to perform the test for that format in order to be able to perform the statistical neutralization of the effect of the non-uniform irradiation.

As described higher, in a preferred embodiment the location of the regions of interest is such that the regions of interest of the largest available detector format in a certain detector inventory are still positioned within the outer dimensions of the detector field of the smallest available format so that for all formats in each of the images of each of the detectors an average signal can be found for all regions of interest of all detector formats.

So for each of the detectors (of different formats) subjected to the test one has a digital signal from which the signal value can be extracted on each of the locations of the regions of interest defined for all available detector formats (so not only for the format of the specific detector under evaluation but also for the other formats in the detector inventory).

For example in an exemplary test in which seven formats are available and in which for each detector the signals of 5 regions of interest are taken, 35 data will be available for determining the non-uniform irradiation profile by statistical averaging as described higher.

Dose Compensation

Figure 7A:
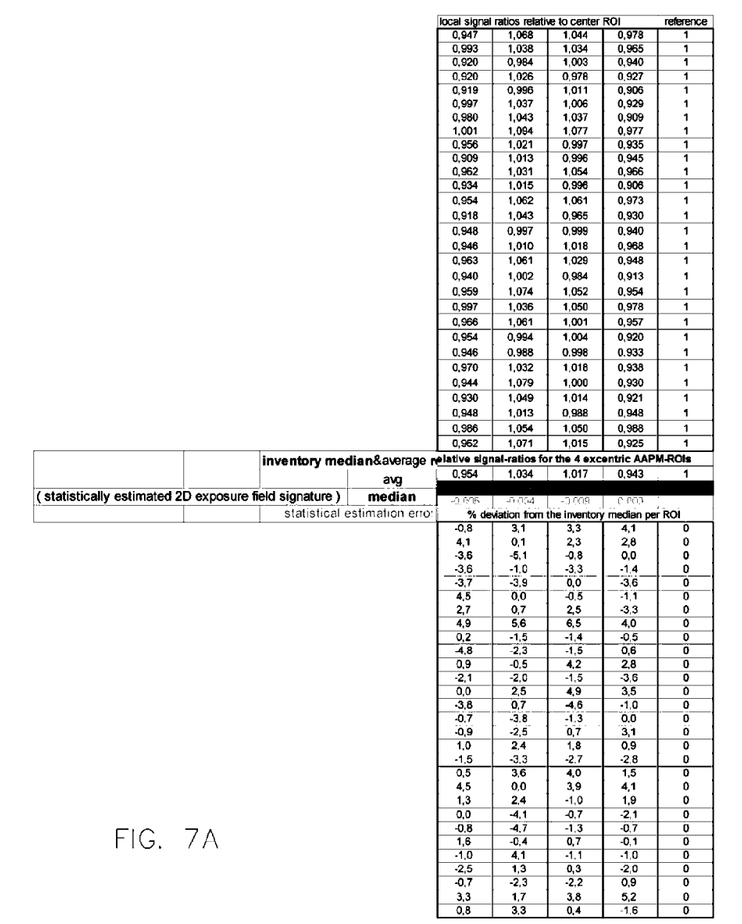
FIGS. 7A and 7B illustrate the method steps regarding compensation of shot-to-shot exposure dose variations and the procedure for automatic check of non-uniformity and/or sensitivity requirements.
Figure 7B:
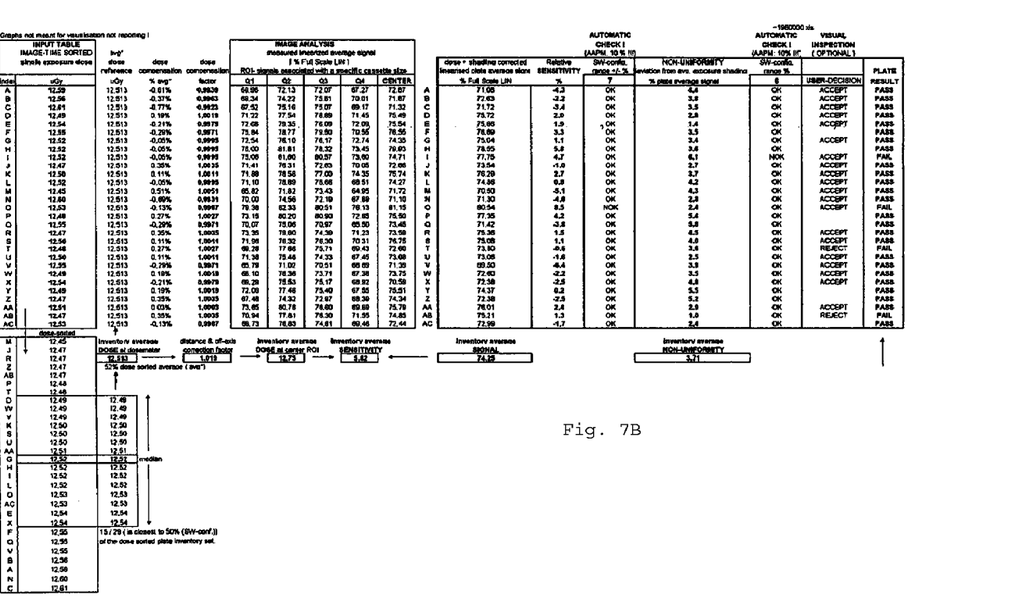

The method steps regarding shot-to-shot exposure dose variations are illustrated by the exemplary data shown in FIG. 7.

The left column of FIG. 7B comprises input data representing the measured radiation dose for a number of detectors named A-Z and AA, AB and AC.

The dose measurement was performed to enable elimination of shot-to-shot instability of the radiation generator and radiation source.

If a detector has received too much radiation the results pertaining to this detector are incomparable with that of a detector that has received less radiation.

In order to be able to eliminate this effect the feedback through dose meter measurement is used. Data are re-calculated so as to pertain to a virtually constant radiation level.

Below the first column is a column comprising the same data but organized in increasing order of magnitude.

In one embodiment the virtual average irradiation level is calculated by first determining the median value of these values and then calculating the average of the values pertaining to a number of detectors values surrounding this median value.

This average value is used as virtual reference dose for this detector inventory test.

On the basis of this value the individual dose values for the different detectors in the test are compensated by means of a dose compensation factor.

This dose compensation factor provides that the signals for the five regions of interest that are obtained for each detector are corrected so that non-uniform irradiation caused by shot-to-shot variations of the exposure is compensated.

The dose compensation factor is smaller than 1 when a detector had a measured dose that was larger than the calculated average dose and the compensation factor is larger than one when the detected dose for a certain detector was smaller than the average calculated dose.

The image analysis column in this figure has 5 columns comprising measured, linearized, average signals expressed as a percentage full scale linear (so data corrected for offset and corrected for square root or logarithmic character of the digitizer). The five columns pertain to the regions of interest located in the center of each of the four quadrants Q1, Q2, Q3, Q4 and the center region of interest. These data are obtained by the analysis explained higher, which is performed for each ROI. This table is two dimensional because it relates to data pertaining to the ROIs for detectors of a single specific format. The table may have an additional dimension comprising ROI data for ROIs corresponding with other detector formats available in the test (as explained higher).

The explanation below will be based on data pertaining to a single, specific cassette format. For the ease of the explanation it is assumed that all detectors in the test have the same format.

To measure the dose, a dose meter is positioned on a detector holder in a fixed position in the irradiation field close to the detector but outside the image field of the detector. This position is a fixed position irrespective of the detector format.

In one embodiment all detectors of different formats are placed on a holder in a position centered relative to the irradiation beam axis. This is performed with the aid of a set of holes and cooperating reference pins.

The actual dose measured by the dose meter does not exactly correspond with the dose at the position of the center (position of the axis of irradiation).

For this effect a correction is calculated that takes into account the difference in distance. This correction is taken into account in the measurements.

Since the detector inventory test is generally a "relative test", meaning that sensitivity of detectors in the test relative to each other is determined, the effective actual dose that a detector has received is of minor importance.

Nevertheless in a cluster diagram such as the diagram shown in FIG. 2 (top right), the average dose value is represented as an absolute value. When the absolute value of the sensitivity of the detectors is calculated, it is important that the effective actual dose received by the detector under evaluation is taken into account.

For the measurements of absolute sensitivity it is important to know the dose on the axis of the incoming radiation. Off axis location and difference in height of the position of the dose meter and the position on the detector on the RX—axis a correction factor is to be determined (on the basis of the difference in distance).

This correction factor is called the 'distance and off axis correction factor' in FIG. 7B and it takes into account the dose level on axis on the detector.

The data in the 'image analysis' column of the table of FIG. 7B give for a specific detector format the signal value on five regions of interest Q1, Q2, Q3, Q4 and the center location. These signal values are raw data (linearized, average signal as percentage of full scale) not yet corrected for shot-to-shot instability of the radiation generator, the influence of the local sensitivity on the different detectors on the different regions of interest and the common mode radiation factor as a consequence of Heel effect, and distance difference in the field distribution.

It is most important to extract the common mode radiation variation in each of these raw image data signals.

For this purpose, the signal values in the regions of interest Q1, Q2, Q3 and Q4 for each detector will be expressed relative to the signal value found in the center region of interest. The signal in the center region of interest is taken as reference and set to '1' and the other signals are converted relative to the signal in the center region of interest. This results in a signal ratio per region of interest.

See table in FIG. 7A (local signal ratios relative to center region of interest).

Figure 8:
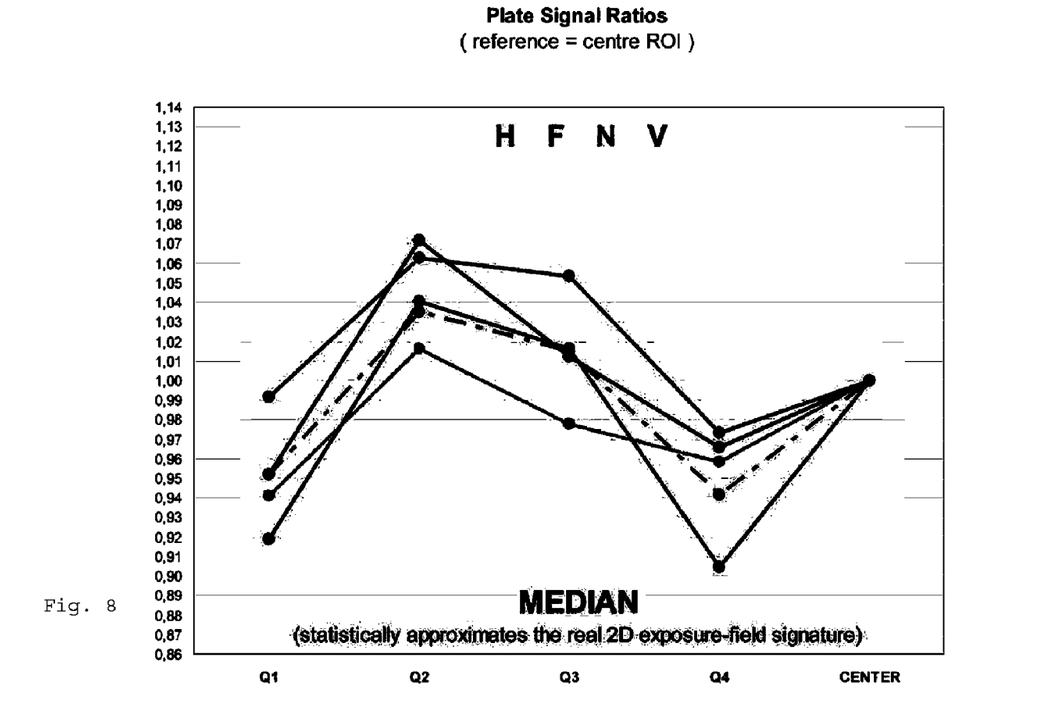
FIG. 8 is a graph illustrating the detector signal ratios expressed relative to the center region of interest which is taken as reference.

This is also shown in the graph of FIG. 8. This detector signal ratio graph shows for each detector per region of interest the signal ratio relative to the center region of interest.

This graph represents the detector signal ratios per quadrant relative to the center ROI, called reference, for four detectors named H, F, N and V. The signal distribution for each detector as a function of the region of interest is normalized relative to the signal detected in the center region of interest.

All graphs are combined in the center location which is the reference location.

A kind of field signal distribution is obtained per detector. The shot-to-shot instability is hereby eliminated.

A dose corrected shading distribution is obtained. This signal shading distribution also comprises the irradiation shading generated by irradiation field non-uniformities.

By averaging these signal shading distributions it can be determined what the underlying common irradiation shading distribution is.

This is performed by averaging the signals pertaining to each detector in the detector inventory test (see table of FIG. 7A local signal ratios relative to center ROI) per region of interest.

This average value per region of interest is shown at the bottom of the table. (average value or median value). This value statistically represents a common mode signal ratio factor per region of interest. By the averaging, the effects of non-uniform sensitivity that might be present per detector are statically eliminated because the average is taken for a large number of detectors.

Below the table of FIG. 7A (top) for each region of interest a median averaged signal ratio with the center ROI taken as reference, is indicated.

The graph that can be formed by connecting these median averaged signal ratio values represents the two dimensional radiation shading since effects of non-uniform sensitivity of the detector are neutralized by the above-described averaging.

The detector signal ratio's graph, shown in FIG. 8, shows for four detectors the corresponding signal ratios after reference calibration to the center region of interest.

If this would have been performed for all detectors in the test, then the median averaged values calculated before, would have been found.

These values, representing the median shading distribution, are illustrated in FIG. 8 by the dot and dash line.

The values would correspond with the variation of the irradiation for all detectors if enough detectors are available in the test.

By extracting this graph the correction factors are obtained for the non-uniform detector irradiation, these values can be used for compensation purposes in the actual calculation of sensitivity and non-uniformity.

Up till now the non-uniform irradiation shading has been extracted by assuming that if for a large number of detectors a median is calculated of the signal ratios whereby the signal in the center region of interest is taken as a reference, one gets the signature of the non-uniform irradiation field.

Determining the Non-Uniformity

Now the non-uniformity per detector has to be determined.

Thereto it is determined to what extent the signal of a specific detector for each of its regions of interest differs from the above determined values of the non-uniform irradiation shading pattern.

This is illustrated in FIG. 2. For each detector the deviation is determined of the ROI signal ratio found for a certain position relative to the median value in the same position in terms of percentage (+ or –). This deviation represents for each ROI of each detector the local, intrinsic non-uniformity after neutralization of non-uniform irradiation and shot-to-shot differences.

Next, for each detector the largest deviation is determined locally for each of the ROIs.

This largest deviation is shown in table of FIG. 7B under the heading "non-uniformity—deviation from average exposure shading, % average signal".

These values are expressed as percentage of the detector average signal and represent the largest deviation found between the local ROI signal ratios and the reference signal ratio for non-uniform irradiation.

In the calculation of the inventory average non-uniformity the next step is the calculation of an average value for all found detector intrinsic maxima for all images part of the detector inventory test. This value is indicated as inventory average non-uniformity value (at the bottom of the table of FIG. 7B).

The values that are found in the non-uniformity column of the table of FIG. 7B are maximal values per detector expressed in absolute values as a percentage of the detector average signal.

Figure 9:
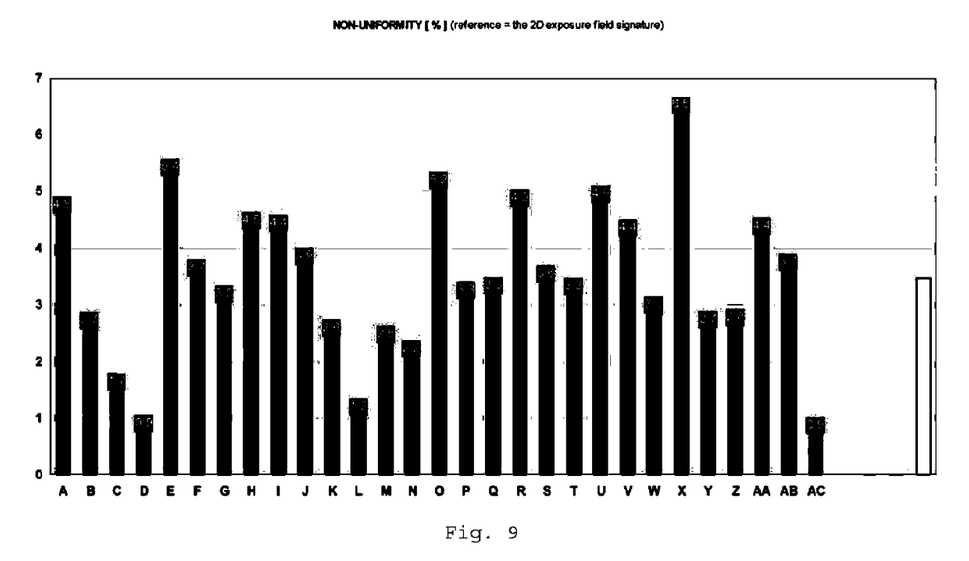
FIG. 9 is a graph illustrating the non-uniformity values for different detectors in a detector inventory.

These values are shown graphically for each detector in the graph of FIG. 9. In the abscissa the detector identification is shown, in the ordinate the percentage absolute deviation, being the maximum determined per detector, is shown.

The bar shown on the right of the figure represents the inventory average non-uniformity. This is the average maximal absolute deviation of the non-uniformity.

Determining the Sensitivity

When determining the sensitivity the following correction values are taken into account: the distance and off axis correction factor correcting the shot-to-shot instability of the radiation source and the field distribution (shading). The calculation of these values has been described before.

In the table of FIG. 7B the middle column represents the dose and shading corrected linearized detector average signal (expressed in full scale linear values).

These values originate from the raw image signal per region of interest. This raw image signal is corrected for local non-uniformities of irradiation (factors shown in table of FIGS. 7A—median calculation of non-uniformity). This is performed for every ROI.

An average value is calculated of these corrected, raw signal values (sum divided by 5 because of the availability of data pertaining to 5 regions of interest). This average value is then corrected for shot-to-shot variations by multiplying this value with the dose compensation factor.

This action renders an average image signal that is corrected for irradiation in-homogeneities as well as for shot-to-shot variations.

This is a dose normalized signal that is representative for the average sensitivity of the detector under evaluation.

This signal is expressed as percentage full scale linear and is calculated for all detectors part of the detector inventory.

This renders dose and exposure shading normalized signal values for each detector in the test. An inventory averaged signal is calculated as the average of these signals calculated for each of the detectors. This value is indicated at the bottom of the table of FIG. 7B as inventory average signal.

Figure 10:
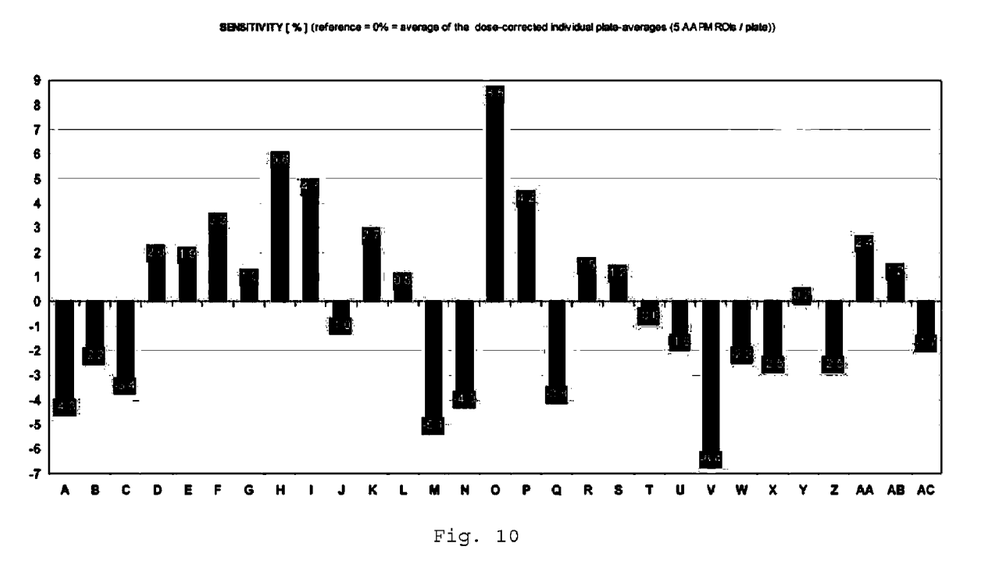
FIG. 10 is a graph illustrating the relative sensitivity for different detectors in a detector inventory.

In FIG. 10 a graph entitled 'sensitivity' is shown. (sensitivity is expressed as a percentage, the reference is zero percent, whereby this reference indicates the average of the dose corrected individual detector average signals) This graph represents for all detectors named A-Z, AA, AB, AC the deviation, in percentage, from the average sensitivity signal (set at zero percent).

Detectors are found that, on the average, are more or less sensitive than the reference. The average of these detector average values, for all members of the entire detector inventory test, is arbitrarily set to zero percent.

This zero percentage also refers to the zero percentage that is shown in the cluster diagram shown in FIG. 2 where the position of all detectors with regard to their characteristics regarding non-uniformity as well as sensitivity, are shown in a single graph.

The inventory average test signal is a percentage linearized signal that is used for relative comparison of detector average sensitivities.

It is also interesting to show in addition to the cluster diagram what the signal represents.

The inventory average signal is therefore shown relative to the value calculated with the dose value on the irradiation axis as an amount of signal per unit dose. This represents an absolute sensitivity.

This value is shown in FIG. 7B in the field: "inventory average sensitivity" where the inventory average is shown as an absolute value obtained by dividing the inventory average value by the dose calculated for the center position (on axis) on the detectors. This value represents an amount of signal per unit dose.

Up till now average non-uniformity and average sensitivity have been determined for the whole inventory.

This average sensitivity signal has also been converted to an absolute value relative to the average dose (average dose calculated in the center of the detectors). (as shown in the cluster diagram of FIG. 2).

Each of the detectors of the inventory are subjected to an identical flat field exposure to generate a radiation image in each of the detectors, from the radiation images the overall field distribution is determined and neutralized in the images, next the non-uniformity is calculated.

What is claimed is:

1. A method of detecting the non-uniformity of radiation detectors participating in a detector inventory test, the method comprising:
    subjecting each of the detectors in an inventory of detectors to a substantially identical flat field exposure in a series of separate radiation exposures for each of the detectors individually to generate a radiation image in each of the detectors,
    generating for each of the detectors a number of ROI signals representing the radiation image at a predefined number of regions of interest (ROIs),
    generating ROI signal ratios by expressing the ROI signals relative to a reference ROI signal detected in one of the regions of interest taken as reference region of interest for each of the detectors,
    averaging the corresponding ROI signal ratios over the detectors in the inventory of detectors participating in the inventory test to extract the non-uniform characteristics of the radiation exposure,
    calculating the local deviations of the ROI signal ratios expressed relative to the corresponding inventory average ROI signal ratios for the detectors participating in the detector inventory test, and
    calculating the absolute value of the largest of the deviations from the average ROI signal ratios for each individual detector in the inventory of detectors.

2. A method according to claim 1 wherein an average detector inventory non-uniformity value is calculated by averaging the absolute values.

3. A method according to claim 1 wherein an acceptance criterion for the non-uniformity is defined and wherein an evaluation is made whether the deviation meets the acceptance criterion.

4. A method according to claim 3 wherein an additional visual inspection of a radiation image of a detector participating in the inventory test is performed for overruling the result of the evaluation.

5. A method according to claim 1 wherein the regions of interest are located in the center of a radiation detector as well as at the center of each of the quadrants.

6. A method according to claim 1 wherein the reference region of interest is a region of interest located at the center of the detector area.

7. A method of detecting the non-uniformity of radiation detectors participating in a detector inventory test, the method comprising the steps of:
    subjecting each of the detectors to a substantially identical flat field exposure to generate a radiation image in each of the detectors,
    generating for each of the detectors a number of ROI signals representing the radiation image at a predefined number of regions of interest (ROIs),
    generating ROI signal ratios by expressing the ROI signals relative to a reference ROI signal detected in one of the regions of interest taken as reference region of interest for each of the detectors,
    averaging the corresponding ROI signal ratios over the detectors participating in the inventory test to extract the non-uniform characteristics of the radiation exposure,
    calculating the local deviations of the ROI signal ratios expressed relative to the corresponding inventory average ROI signal ratios for the detectors participating in the detector inventory test, and
    calculating the absolute value of the largest of the deviations from the average ROI signal ratios for each detector;
    wherein additional ROI signal data are generated by rotating the detectors by a predefined angle, exposing the detectors to the substantially identical flat field exposure and detecting ROI signals at the same locations of the regions of interests.

8. A method according to claim 7 wherein an average detector inventory non-uniformity value is calculated by averaging the absolute values.

9. A method according to claim 7 wherein an acceptance criterion for the non-uniformity is defined and wherein an evaluation is made whether the deviation meets the acceptance criterion.

10. A method according to claim 9 wherein an additional visual inspection of a radiation image of a detector participating in the inventory test is performed for overruling the result of the evaluation.

11. A method according to claim 7 wherein the regions of interest are located in the center of a radiation detector as well as at the center of each of the quadrants.

12. A method according to claim 7 wherein the reference region of interest is a region of interest located at the center of the detector area.

* * * * *

UNITED STATES PATENT AND TRADEMARK OFFICE
CERTIFICATE OF CORRECTION

PATENT NO. : 7,538,317 B2
APPLICATION NO. : 11/764518
DATED : May 26, 2009
INVENTOR(S) : Marc Cresens and Walter Exelmans It is certified that error appears in the above-identified patent and that said Letters Patent is hereby corrected as shown below:

On the title page, in Column 2, at paragraph (57) ABSTRACT, in line 2, after "radiation", delete "mage" and insert --image--.

Signed and Sealed this

Eighteenth Day of August, 2009

David J. Kappos
*Director of the United States Patent and Trademark Office*